(12) United States Patent
Mekhsian et al.

(10) Patent No.: US 10,290,226 B2
(45) Date of Patent: May 14, 2019

(54) SYSTEM AND METHOD FOR MONITORING FOOD WASTE

(71) Applicant: WINNOW SOLUTIONS LIMITED, London (GB)

(72) Inventors: Hrair Mekhsian, London (GB); Kevin Duffy, London (GB); Marc Zornes, London (GB)

(73) Assignee: WINNOW SOLUTIONS LIMITED, London (GB)

( * ) Notice: Subject to any disclaimer, the term of this patent is extended or adjusted under 35 U.S.C. 154(b) by 0 days.

(21) Appl. No.: 15/305,840

(22) PCT Filed: Apr. 21, 2015

(86) PCT No.: PCT/GB2015/051184
§ 371 (c)(1),
(2) Date: Oct. 21, 2016

(87) PCT Pub. No.: WO2015/162417
PCT Pub. Date: Oct. 29, 2015

(65) Prior Publication Data
US 2017/0069222 A1 Mar. 9, 2017

Related U.S. Application Data

(60) Provisional application No. 61/982,012, filed on Apr. 21, 2014.

(51) Int. Cl.
G06F 19/00 (2018.01)
G09B 19/00 (2006.01)
G01G 17/04 (2006.01)
G01G 19/414 (2006.01)

(52) U.S. Cl.
CPC ............. *G09B 19/00* (2013.01); *G01G 17/04* (2013.01); *G01G 19/414* (2013.01)

(58) Field of Classification Search
CPC ............. C05F 11/02; C05F 11/08; C05D 9/00
USPC .......................................... 702/173, 182–185
See application file for complete search history.

(56) References Cited

U.S. PATENT DOCUMENTS

| | | | |
|---|---|---|---|
| 7,415,375 B2 | 8/2008 | Shakman et al. | |
| 2006/0015289 A1* | 1/2006 | Shakman | G01G 19/414 702/173 |
| 2014/0095108 A1 | 4/2014 | Milnes | |

OTHER PUBLICATIONS

International Search Report for PCT/GB2015/051184 dated Aug. 5, 2015, 3 pages.

* cited by examiner

*Primary Examiner* — Edward Raymond
(74) *Attorney, Agent, or Firm* — Nixon & Vanderhye P.C.

(57) ABSTRACT

The present invention relates to a system for monitoring food waste. The system includes a weight mechanism configured for weighing a waste receptacle, wherein the waste receptacle is configured for receiving food waste from a plurality of consecutive disposal events before emptying, a processor configured for measuring the difference in weight of the waste receptacle between each disposal event and calculating the weight of a disposal event based upon the difference and a user interface configured to receive at least one indication categorizing the food waste in a disposal event by a user. A method for monitoring food waste is also described.

39 Claims, 9 Drawing Sheets

SYSTEM AND METHOD FOR MONITORING FOOD WASTE

This application is the U.S. national phase of International Application No. PCT/GB2015/051184 filed Apr. 21, 2015 which designated the U.S. and claims the benefit of U.S. Provisional Application No. 61/982,012 filed Apr. 21, 2014, the entire contents of each of which are hereby incorporated by reference.

FIELD OF INVENTION

The present invention is in the field of food waste monitoring. More particularly, but not exclusively, the present invention relates to food waste monitoring in a commercial environment.

BACKGROUND

Commercial food service operations and restaurants throw away 5-20% of the edible food they purchase. Ingredients cost approximately ⅓ of revenue for the typical player. Avoidable waste therefore represents 2-7% of revenue. In a sector where net profits are less than 10%, this can make a material difference in profitability.

The first step to reducing food waste is measuring it. Existing solutions come in the form of highly manual processes used to track food waste, such as weighing bags of waste at end of day. They are generally hard to sustain for more than a quick audit, and can be expensive due to the auditor/consultant time required. They also tend to have less granular data on what is being thrown away, which makes them less impactful.

Other solutions have been developed which are more automated and granular than the manual processes described above.

One such solution is provided by Leanpath, Inc. and is described in U.S. Pat. No. 7,415,375. In this solution, a food waste monitoring system is provided where users fill a container with a food waste and place the container on a weigh station. The weigh station records the total weight and requests detail about the food waste from the user. The container is then emptied into a waste receptacle and may be reused. The weight and data is stored and is used to analyse food waste.

The disadvantage with the solution described above is that is depends on users placing food waste into the containers, weighing the containers, and recording the type of food waste. This solution is quite onerous to implement for a busy food service operation or restaurant where the users are likely to be busy kitchen staff and, consequently, this solution suffers from low compliance. This leads, therefore, to missing data on some or most food waste and an erroneous analysis of the operation's food waste.

Accordingly, there is a desire for an improved waste monitoring system.

It is an object of the present invention to provide a food waste monitoring method and system which overcomes the disadvantages of the prior art, or at least provides a useful alternative.

SUMMARY OF INVENTION

According to a first aspect of the invention there is provided a system for monitoring food waste, including:

A weight mechanism configured for weighing a waste receptacle, wherein the waste receptacle is configured for receiving food waste from a plurality of consecutive disposal events before emptying;

A processor configured for measuring the difference in weight of the waste receptacle between each disposal event and calculating the weight of a disposal event based upon the difference; and A user interface configured to receive at least one indication categorising the food waste in a disposal event by a user.

According to a further aspect of the invention there is provided a method for monitoring food waste, including:

a. A processor receiving a first weight from a weight mechanism of a waste receptacle after a first disposal event;

b. The processor receiving a second weight from a weight mechanism of a waste receptacle after a second disposal event;

c. The processor determining the weight for the second disposal event based on the difference between the first and second weights; and d. A user interface receiving an input from a user to categorise the food waste for the second disposal event.

Other aspects of the invention are described within the claims.

BRIEF DESCRIPTION OF THE DRAWINGS

Embodiments of the invention will now be described, by way of example only, with reference to the accompanying drawings in which.

show graphs illustrating stabilisation methods for use with an embodiment of the invention.

DETAILED DESCRIPTION OF PREFERRED EMBODIMENTS

The present invention provides a food waste monitoring method and system.

The inventors have discovered that food waste can be monitored with high compliance by automatic capture of weight differences between disposal events occurring in a waste receptacle.

Figure 1:
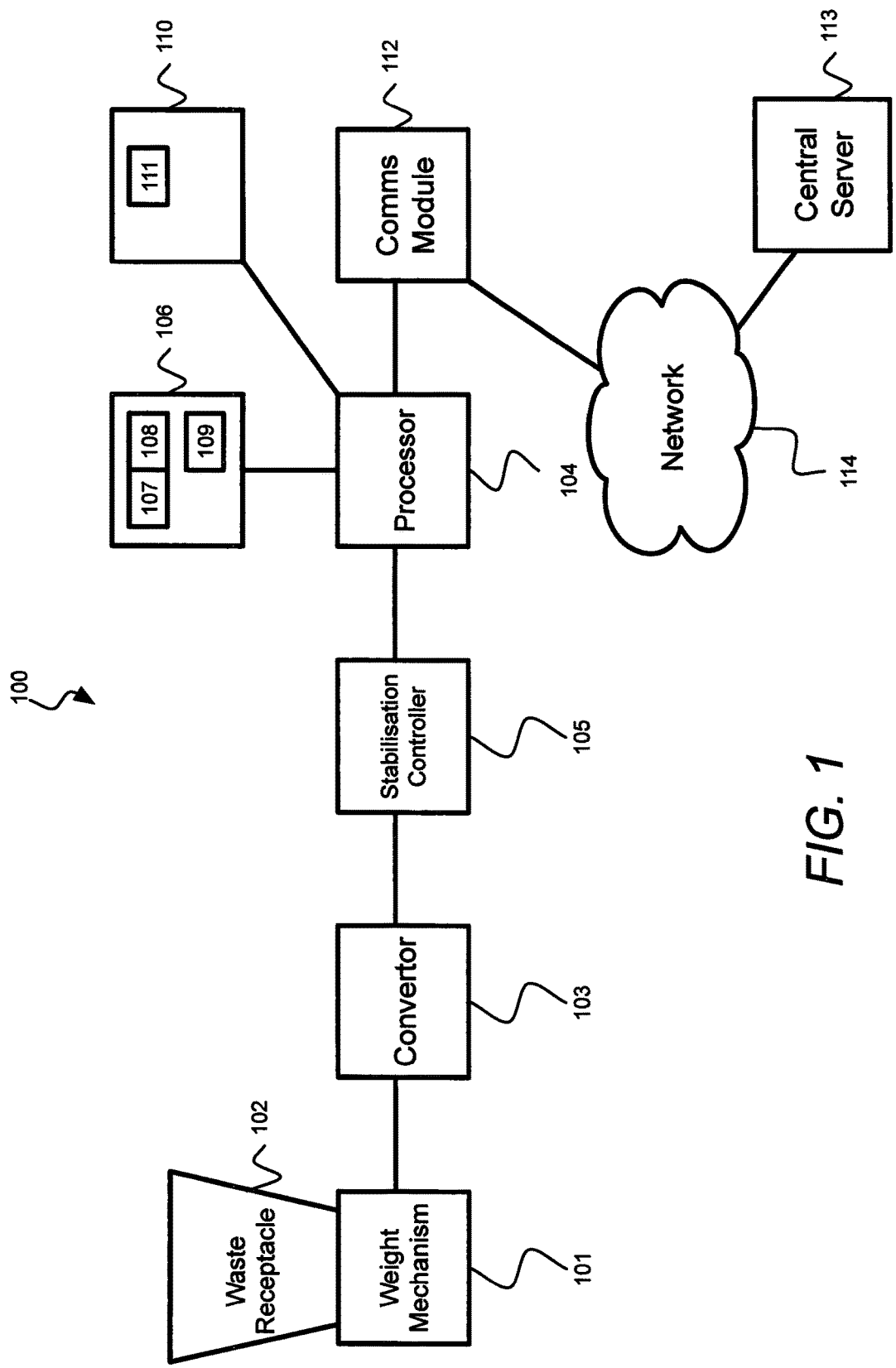
FIG. 1: shows a block diagram illustrating a system in accordance with an embodiment of the invention.

In FIG. 1, a system 100 in accordance with an embodiment of the invention is shown.

A weight mechanism 101 is shown. The waste mechanism 101 may be an analog scale or a digital scale.

A waste receptacle 102 is shown. The waste mechanism 101 may be configured for measuring the weight of the waste receptacle 102. For example, the waste receptacle 102 may sit on top of the waste mechanism 101. The waste receptacle 102 is configured for receiving food waste via a plurality of disposal events.

Where the waste mechanism 101 is an analog scale, an analog-to-digital convertor 103 may be used to convert measurements into digital form.

A processor 104 is also shown. The processor 104 is configured for receiving weight signals from the waste mechanism 101 directly or via the convertor 103.

The processor 104 may receive signals from the waste mechanism 101 or convertor 103 via a stability controller 105. The stability controller 105 may be configured to detect and control delivery of weight signals to the processor 104. The stability controller 105 may control transmission of weight signals based on the stability of the weight signal. Stability may be determined by the stability controller 105 using a variable response time based upon the magnitude of the change between the current weight and the previous weight. For example, a threshold may be set such that if a weight change is defined as low (i.e. below a low threshold), the response time may be increased for delivering a stable weight. This may help to eliminate small fluctuations likely to be noise. When the weight change is high (i.e. above a high threshold), a weight signal may be transmitted to the processor 104, but the stability controller 105 may monitor the weight signal from the weight mechanism 101 and update the weight signal transmitted to the processor 104 to reflect a more accurate weight assessment. This may be useful, for example, when a user accidentally places their own weight on the weight mechanism when disposing food waste. The thresholds for low and high can be updated periodically and calculated based upon historical data.

The processor 104 may be configured for calculating the weight for a disposal event by measuring the difference in weight of the weight receptacle 102 between each disposal event. For example, if the weight signal after a first disposal event is 1.05 kg and the weight signal after a second disposal event is 1.50 kg, the processor may calculate the weight for the second disposal event as 0.45 kg.

A user interface 106 is also shown. The user interface 106 may comprise a display 107 and an input 108. In one embodiment, the display 107 and input 108 may be combined such as in a touch-screen interface. The user interface 106 may comprise an audio output 109.

The user interface 106 may be configured for receiving indications via the input 108 from a user to categorise the food waste in a disposal event. The user interface 106 may prompt the user via the display 107 to provide indications for one or more different category types, including: a stage of waste occurrence, type of waste, specific waste, and/or reason for dumping out the waste. The user interface 106 may use a multi-stage menu of options to prompt the user via the display 107 and receive input via 108. For example, the stage of waste occurrence could be prompted by asking the user to select one of the following options: inventory, preparation, overproduction, or plate left-over.

The user interface 106 may display in the list of options an option which automatically defines indications across a plurality of category types.

The system 100 may include a user identity apparatus 110 configured for obtaining the user's identity. The user identity apparatus 110 may include a camera 111. The user identity apparatus 110 may obtain the user's identity automatically, for example, via facial recognition using the camera 111, or via proximity of a user's physical identifier, such as a RFID (Radio Frequency Identifier) via a RFID reader. In an alternative embodiment, the user interface 106 may be configured for obtaining the user's identity, for example, by receiving a user code via the input 108.

The system 100 may include a communications module 112 configured to communicate with a central server 113 via a communications network 114. The processor 104 may be configured to transmit weights and/or categorisations for disposal events to the central server 113 using the communications module 112. The weights and/or categorisations may be transmitted to the central server 113 periodically.

The central server 113 and/or the processor 104 may be configured to process the weights and/or categorisations to remove user error. The processing may involve the detection and correction of errors in weights and/or categorisation.

The central server 113 may be configured to receive weights and/or categorisations for disposal events from a plurality of locations. For example, the weight and/or categorisation information may come from weight mechanisms deployed in different parts of the same commercial food operation, or within multiple commercial food operations.

The central server 113 may be further configured to analyse the weights and/or categorisations received from one or more locations to produce reports. The reports may be delivered to one or more user devices.

The central server 113 may be further configured to periodically update the multi-stage menu utilised by the user interface 106.

Figure 2:
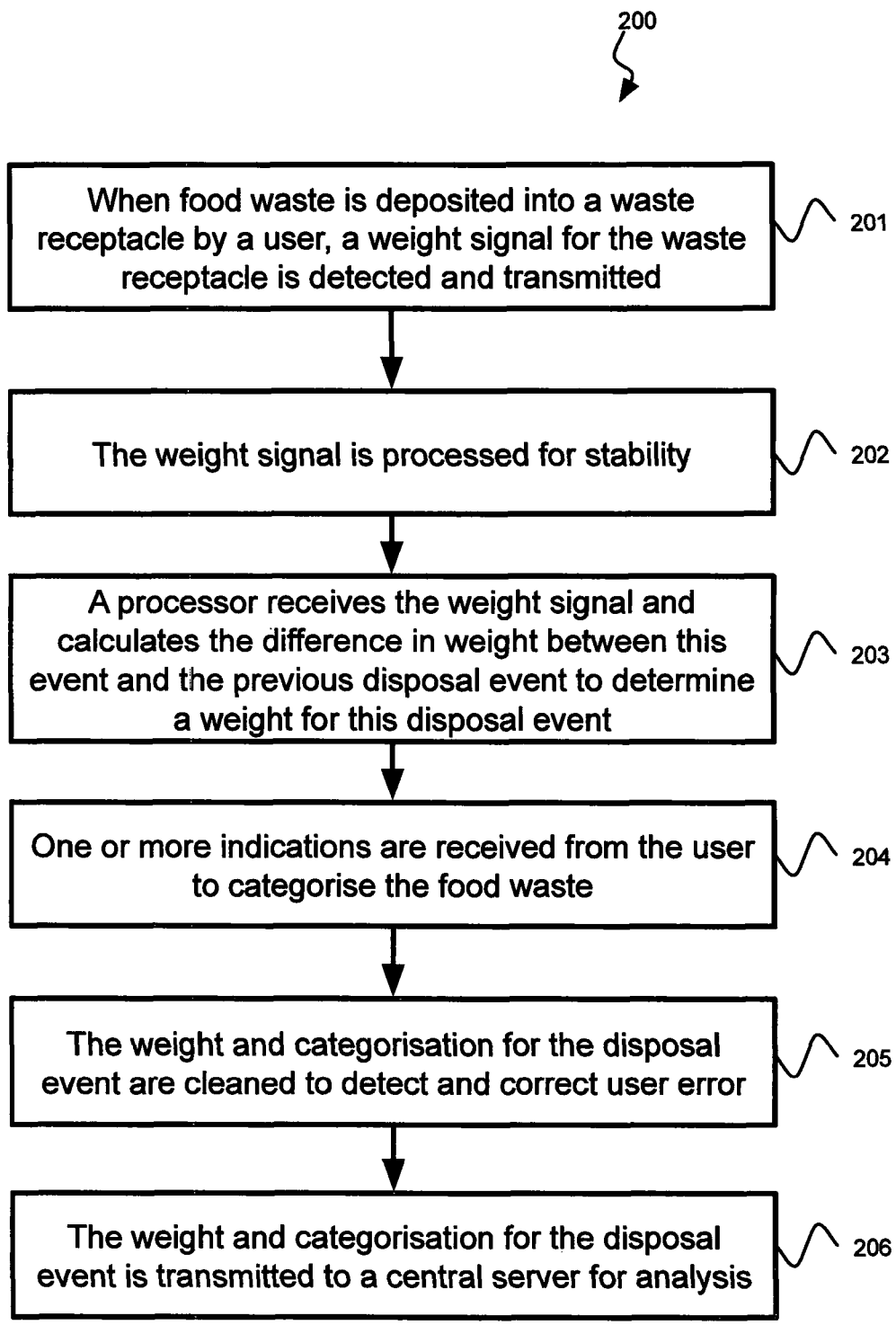
FIG. 2: shows a flow diagram illustrating a method in accordance with an embodiment of the invention.

Referring to FIG. 2, a method 200 for monitoring food waste will be described.

In step 201, a disposal event occurs when a user deposits food waste into a waste receptacle (e.g. 102). A weight for the waste receptacle is detected by a weight mechanism (e.g. 101) and a weight signal is transmitted. The weight signal may be processed from analog to digital by a convertor (e.g. 103) before being transmitted.

In step 202, the weight signal may be intercepted and processed for stability, for example by a stability controller (e.g. 105). The weight signal may be monitored for a period of time to confirm stability. The period of time may be dependent on the magnitude of change between the weight signal and a weight signal for the previous disposal event. In one embodiment, where the weight signal is below a low threshold, the period of time is increased. The weight signal may be delayed as a result of monitoring or updated as a result of monitoring. For example, where the weight signal is below a low threshold, the weight signal may be delayed; and where the signal is above a high threshold, the weight signal may be updated when the signal drops below the high threshold.

In step 203, a processor (e.g. 104) receives the weight signal and calculates a difference in weight of the weight receptacle between this disposal event and the previous disposal event. The difference in weight is the weight of the current disposal event.

In one embodiment, this weight is displayed to the user via a user interface (e.g. 106). An alarm may sound via an audio output (e.g. 109) to alert the user that there is food waste to categorise.

An identity for the user may be determined (e.g. by 110). This identity may be associated with the weight calculated and/or categorisations defined by the user for the disposal event. The identity of the user may be detected automatically, for example, via facial recognition. Where a user is unknown, the user may be prompted to provide identity information.

In step 204, one or more indications may be received from the user to categorise the food waste (e.g. via 106). A selection of options may be displayed to the user to define their indication. In one embodiment, a plurality of indications are received from the user, including a stage that the food was wasted during, the type of food waste, a specific item of food waste, and the reason for the food waste. In some embodiments of the invention, one or more options may be provided to the user to define automatically all or some of the indications. For example, some combinations of indications are common and these combinations may be provided as one-touch options.

In one embodiment, where the weight signal has been updated as a result of stability processing, the updated weight signal may be used by the processor (e.g. 104) to calculate the weight for the disposal event.

In step 205, the captured weights and/or associated categorisations for the disposal event may be cleaned, for example, to remove user error.

The cleaning may include the detection and correction of erroneous weights and/or categorisations.

In one embodiment, erroneous weights are detected and corrected using deviations from historically captured data such as previous and/or later disposal events. For example, standard deviation techniques could be used to smooth out the captured weights for disposal events. The historically captured data may be data captured historically from that weight mechanism, from weight mechanisms at that commercial food service operation or across all associated or related commercial food service operations, or across all captured data.

In one embodiment, erroneous disposal events are detected and corrected using pattern recognition. For example, one or more rules may be defined for common erroneous scenarios and used to identify erroneous disposal events, such as waste receptacle changes being identified as a disposal event.

In one embodiment, at least a part of this cleaning may occur at the processor 104. The processor 104 may determine that the presence of a user has caused an error, for example, the user may be leaning on the weight receptacle affecting accuracy of the weight signals, and correct the error by detecting the subsequent absence of a user and variation in the weight signal, to update the weight for the disposal event using the current weight signal. Detection of the absence of a user may be via a camera or it may be inferred (for example, after a period of time has lapsed the system can assume that the user has left).

In step 206, the captured weights and/or categorisations may be transmitted to a central server (e.g. 113) for processing, collation, and/or analysis. The results of the analysis may be delivered as a report to one or more users. The report may include summaries of food waste and/or suggestions for reducing waste based on the analysis. The transmission to the central server may occur periodically. The one or more users may be the owners or managers of the commercial food service operations. In one embodiment, some analysis may be displayed on the user interface when no disposal events are currently taking place.

In one embodiment, where a user identity is associated with captured weights and/or categorisations for disposal events, the captured data may be processed and analysed to generate feedback to the user. The feedback may be displayed to the user, for example, via the user interface 106 when the user next uses the system 100.

Figure 3:
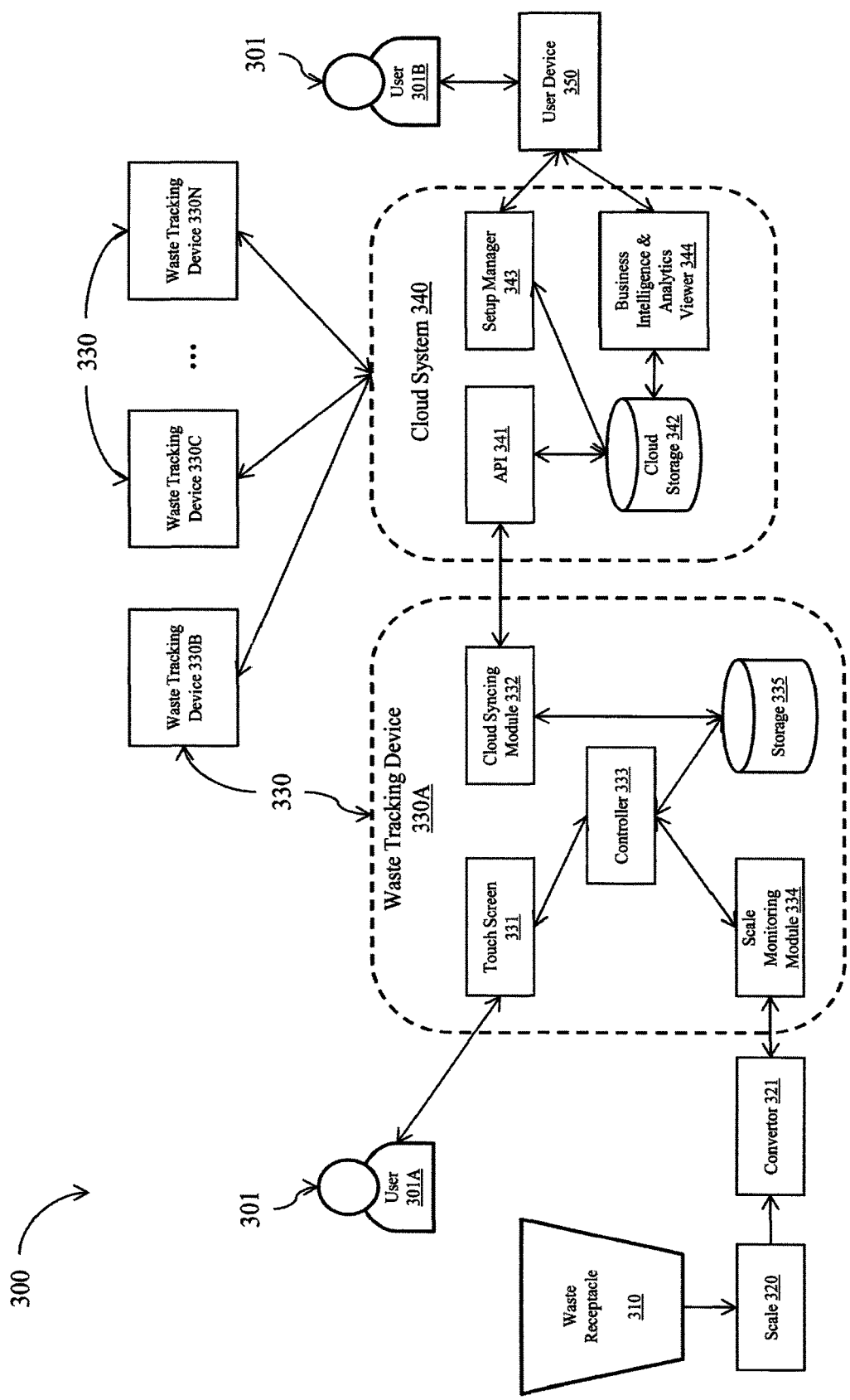
FIG. 3: shows a block diagram illustrating a system in accordance with an embodiment of the invention.

With reference to FIG. 3, another system 300 in accordance with an embodiment of the invention will be described.

System 300 includes a waste receptacle 310 that sits on a scale 320. In one embodiment, the scale 320 is an industrial, washable floor scale that is large enough for the entire waste receptacle 310 to be placed on the scale 320. The scale 320 may include both analog and digital scales. For analog scales, a convertor 321 is coupled to the scale 320 to convert any analog readings representing a total weight to a digital representation that can be processed by a computer. Waste receptacle 310 can be any waste bin available.

The system 300 includes a waste tracking device 330A. The waste tracking device 330A includes a waste scale monitoring module 334 which receives a digital signal from the convertor 321 representing the total weight on the scales. The waste scale monitoring module 334 converts the digital signal, representing the total weight on the bin, to a series of scale events that can be used to drive the user interface for the food categorization. The module 334 also includes logic to prevent accidental changes in weight (e.g. staff foot on scale) from being interpreted as food waste. The series of scale events may be new weight, weight added/removed, and scale connected/disconnected. The module 334 may be configured to interface with a plurality of different scales.

The waste tracking device 330A includes a master controller module 333 which receives scale events from module 334, menu set-up information, and previous transactions data. The module 333 controls the user interface that drives the touch-screen 331 and outputs transactions generated by the weight change combined with data entered on the touch-screen by the user.

The master controller module 333 controls the different components of the waste tracking device 330A. It uses weight data, menu information and previous transactions to create the user interface that users (e.g. staff) use. It also feeds back the transactions generated by staff selections into local storage 335.

The waste tracking device 330A includes a cloud syncing module 332 which takes transactions from local storage 335 and transmits them periodically to a cloud system 340. The module 332 also downloads changes in the kitchen menu-up setup (used by module 333 to control output for 331) and stores these in local storage 335. The module 332 may be isolated from the rest of the device 330A through local storage to ensure that loss of internet connectivity only affects the syncing feature.

An application program interface (API) module 341 is provided within the cloud system 340 to receive transactions and logs from a plurality of waste tracking devices 330, and to transmit menu and application settings to the waste tracking devices 330. The data received from the different devices 330 are aggregated by the API module 341 and stored in a centralized storage 342.

The cloud system 340 includes a menu & data-entry setup manager 343. The setup manager 343 is an interface that allows modifying menus, recent transactions, and viewing basic reports without interacting with the waste tracker touch screens.

The cloud system 340 also includes a business intelligence & analytics viewer 344. The viewer 344 allows customers 301B to view more complex reports, such as how different sites are performing, at their user devices 350. It also allows them to create their own reports.

Each time food is placed into the waste receptacle 310, the system 300 generates a visual (flashing screen) or auditory (beep) prompt that directs the kitchen staff's attention to a touch-screen placed near the bin. The user 301 is asked to specify what type of food was just thrown away, and why, with a few taps of the screen.

The user 301 is never required to weigh the food waste, which has three benefits: (1) it reduces the labour time/cost of tracking waste; (2) it simplifies the process, thus increasing compliance rates; and (3) it allows monitoring and enforcement of the compliance rate, as all food waste, whether it is categorized or not, is registered by the system.

The system 300 improves the ability to monitor and reduce food waste in kitchens, through technological innovation in three areas. These are:

[A] In-process measurement of the waste;

[B] Streamlined categorization procedure; and

[C] User engagement features that promote behaviour change.

The system 300 is designed to minimize the number of taps required to categorize an item of waste. A single transaction takes three to five seconds on average to complete, which in a typical kitchen results in ten minutes of labour time per day, spread over eight staff members.

In the system 300, the user 310 is required to make between one and five selections depending on the item being categorized. The longest workflow (five taps) requires the user 310 to select:

- The stage during which the waste occurred (Inventory, Preparation, Overproduction, etc)
- The type of food being thrown away (Pasta, Fish, Meat, etc)
- The specific food item being thrown away (Chicken Breast, Salmon, Carbonara, etc)
- The reason the food item is being thrown away (Spoiled, Damaged, etc)
- A confirmation button (optional)

The shortest workflow (one tap) is made possible by providing "quick entry" buttons to the user 310, on the first data-entry screen. A quick entry represents a pre-defined set of: Stage, Group, Food, and Reason. Since it is the most frequently wasted items that are assigned a quick entry button, the average number clicks per transaction is drastically reduced.

Even items without a quick-entry button, do not usually require the full workflow (five taps). The system 300 has a variable workflow length depending on the nature of item being categorized. For example, if one were to choose "Plate left-over" as the 'stage' of waste, the system 300 would not ask for a 'reason' if it is most likely unknown.

A combination of quick entries, a short full workflow, and a variable workflow length result in a streamlined process that on average requires only three taps.

A significant portion of any food waste reduction in kitchens is usually achieved through staff engagement in the waste measurement process, which eventually leads to behavioural changes that reduce waste.

Whenever a food item is categorized, the value of the waste is relayed in real-time to the staff, in the form of an on-screen informational message. For example: "Thank You. You have thrown away $7.20 of Salmon".

When at idle (no waste being thrown away) the system's 300 screen 331 displays a series of reports that help the kitchen staff keep track of their progress over different time periods, as well as their performance compared to other kitchens. Some of the metrics relayed back to them include:

- Categorization %: Percentage of weight thrown away that was categorized by staff
- The amount of waste thrown away today, by weight.
- Waste today (by value) compared to the same day last week, and two weeks prior.
- Waste week to date (by value), compared to week to date this time last week, and two weeks prior
- The top items of food, thrown away today.
- The distribution of food thrown away today, by food group (Meat, Fish, Dairy, etc).

Algorithms Used in Real-Time Food Waste Tracking

Figure 4:
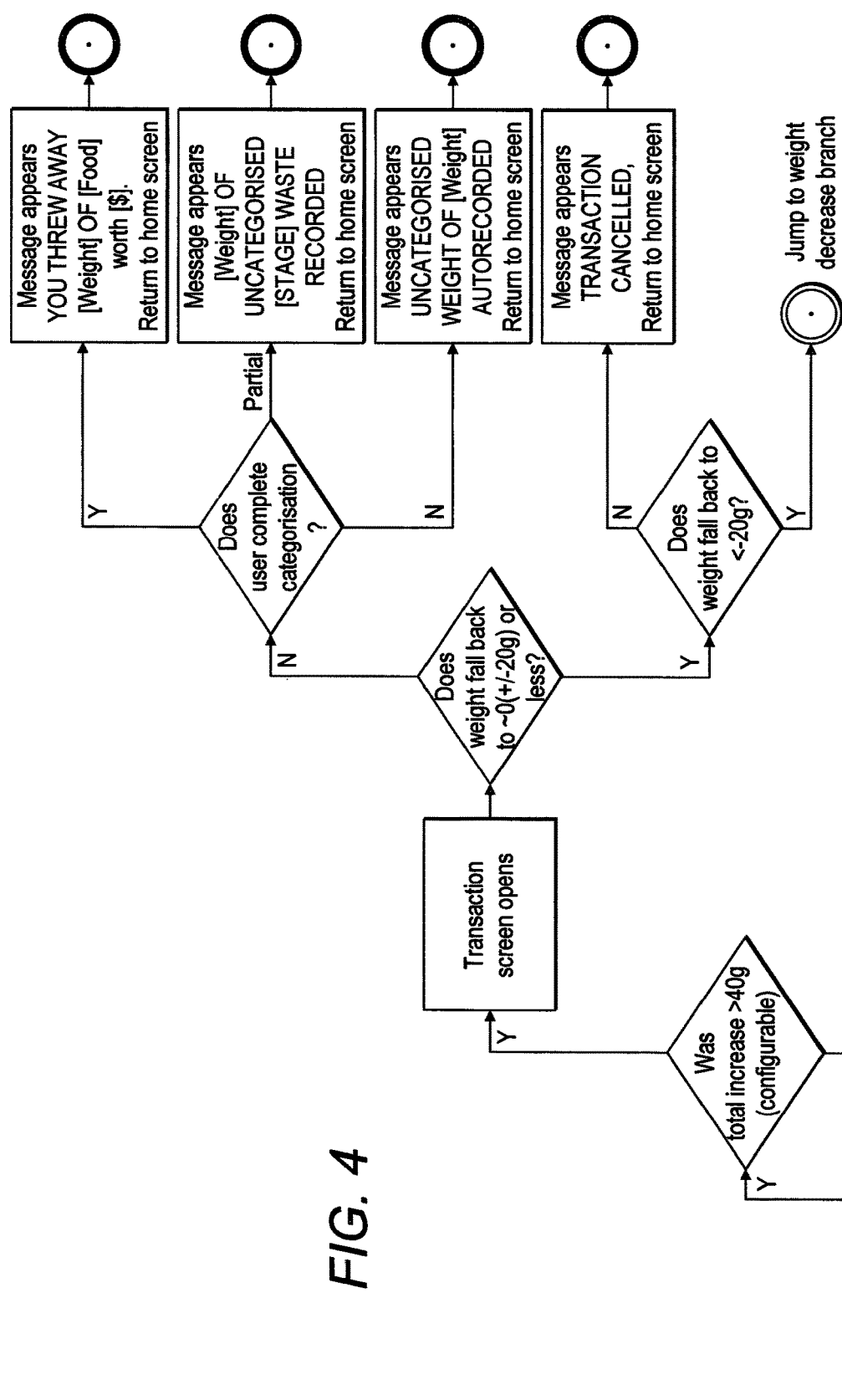
FIG. 4: shows a flow diagram illustrating an exemplary method for detecting noise in weight signals for use with the embodiment shown in FIG. 3.
Figure 4:
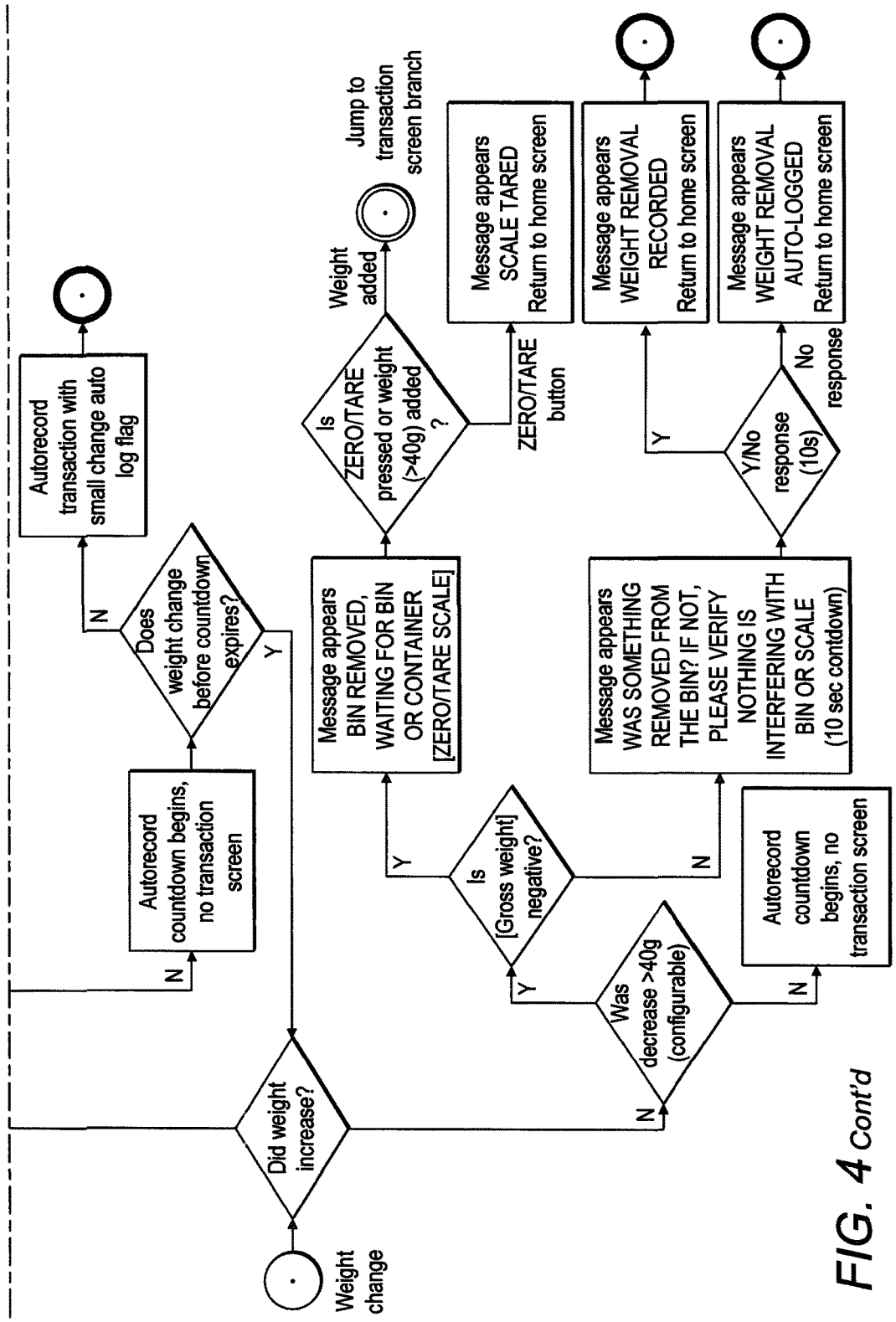

Turning to FIG. 4, accurately measuring food waste, as it is thrown into a general-use bin, without the use of containers (i.e. in-process) presents several challenges. Food waste transactions are typically very small compared to the weight of the bin (as low as 10 g vs 10000 g), and kitchens are generally busy, cramped spaces with a lot of accidental knocks of the bin. To tackle these challenges, a series of algorithms are utilised to make waste tracking as seamless as possible within the confines of the average kitchen environment.

Stabilization vs. Responsiveness

Preventing noise and accidental knocks of the bin being registered as food waste requires a delayed system response, during which the stability of the weight change can be analyzed and confirmed. Unfortunately, delayed responses have a negative impact on the user experience, which in the long run leads to reduced compliance. To cater for these two opposing constraints, the Winnow system uses an algorithm with a variable response time based on the magnitude of the change.

Figure 5A:
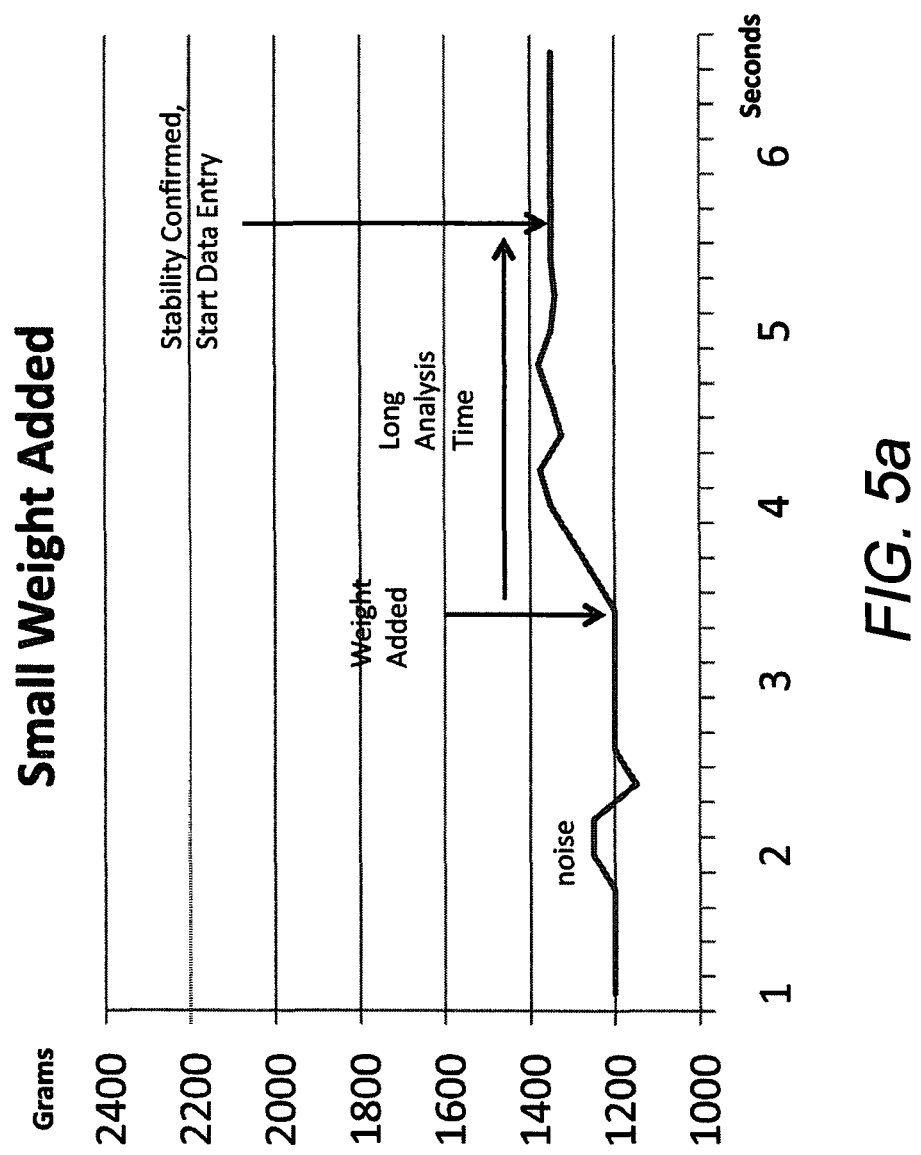
FIGS. 5a to 5d.
Figure 5B:
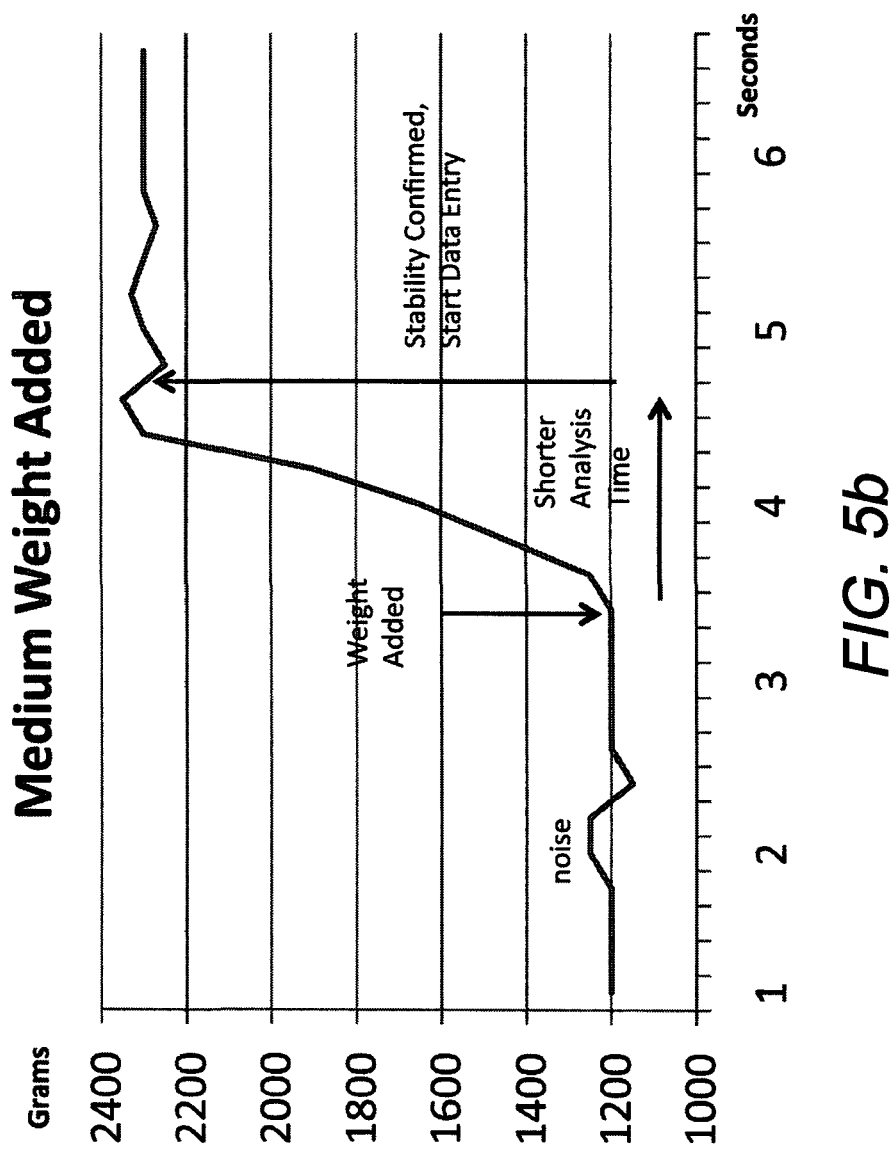
Figure 5C:
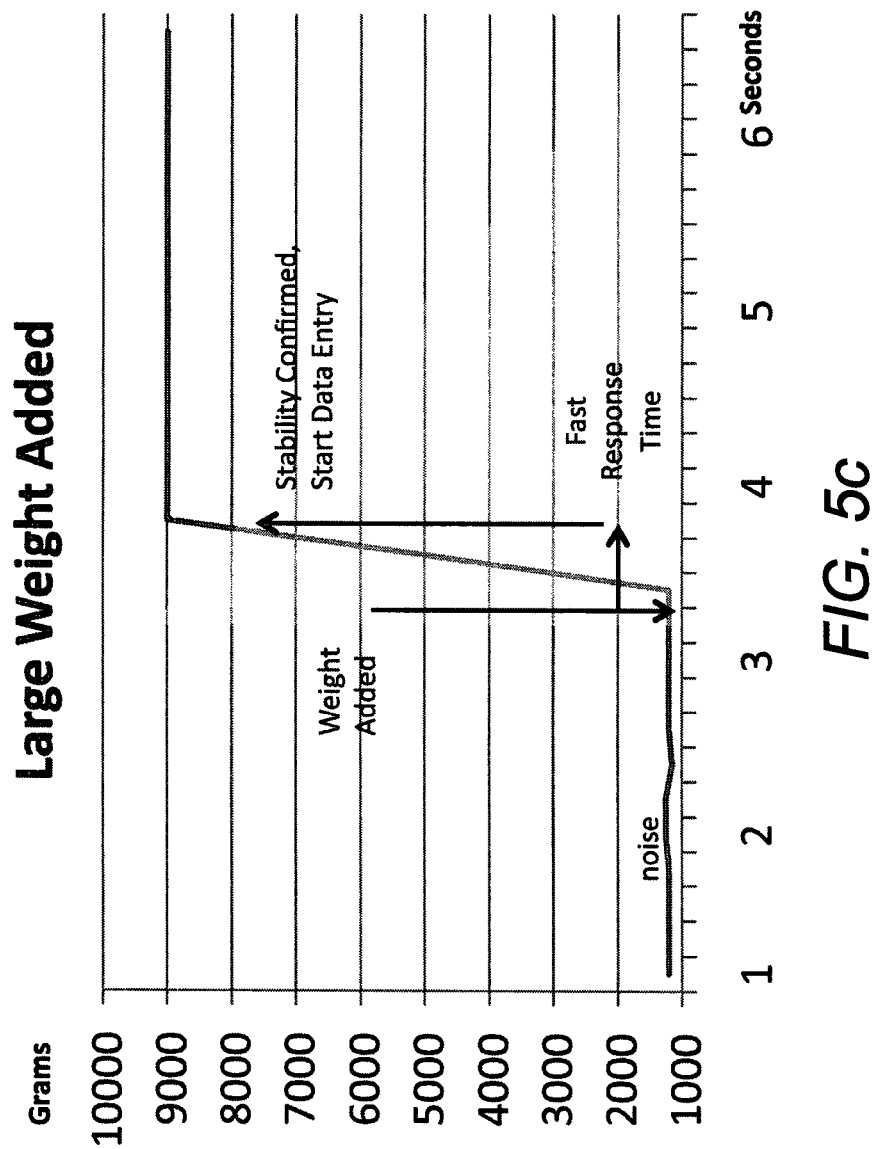

Small weight changes are more likely to be noise, and therefore require longer analysis time to confirm a stable reading (as shown in FIG. 5a). Medium weight changes are very likely to be food waste falling into the bin, and therefore require a much shorter analysis time before confirming a stable reading, leading to a fast response time (as shown in FIG. 5b). Very large weight changes are more likely to be staff interacting with the bin therefore, though the response must be fast (as shown in FIG. 5c), a longer period of post-response analysis must be allowed to confirm whether the reading has stabilised or needs to be cancelled (e.g. accidental foot on bin). The definition of 'small', 'medium' and 'large' weight changes are set based on historical data along two dimensions: 'weight vs probability of being categorized' and 'weight vs observed frequency'. These thresholds are calculated by analysing historic data and are periodically updated.

Weight Drop Handling

Most of the time, the weight of the waste bin, increases gradually over the span of the day, as food is thrown away, until the bin liner is replaced and the weight drops back down to near 0. On a less frequent basis, the weight of a bin decreases. Determining the correct reason for the decrease and responding accordingly is an important challenge of weight-based food tracking.

The system's 300 algorithm, depicted above, is based on experience of real-world cases. It takes into account the magnitude of the drop compared to the total weight on the bin, and the recent transaction history.

Figure 5D:
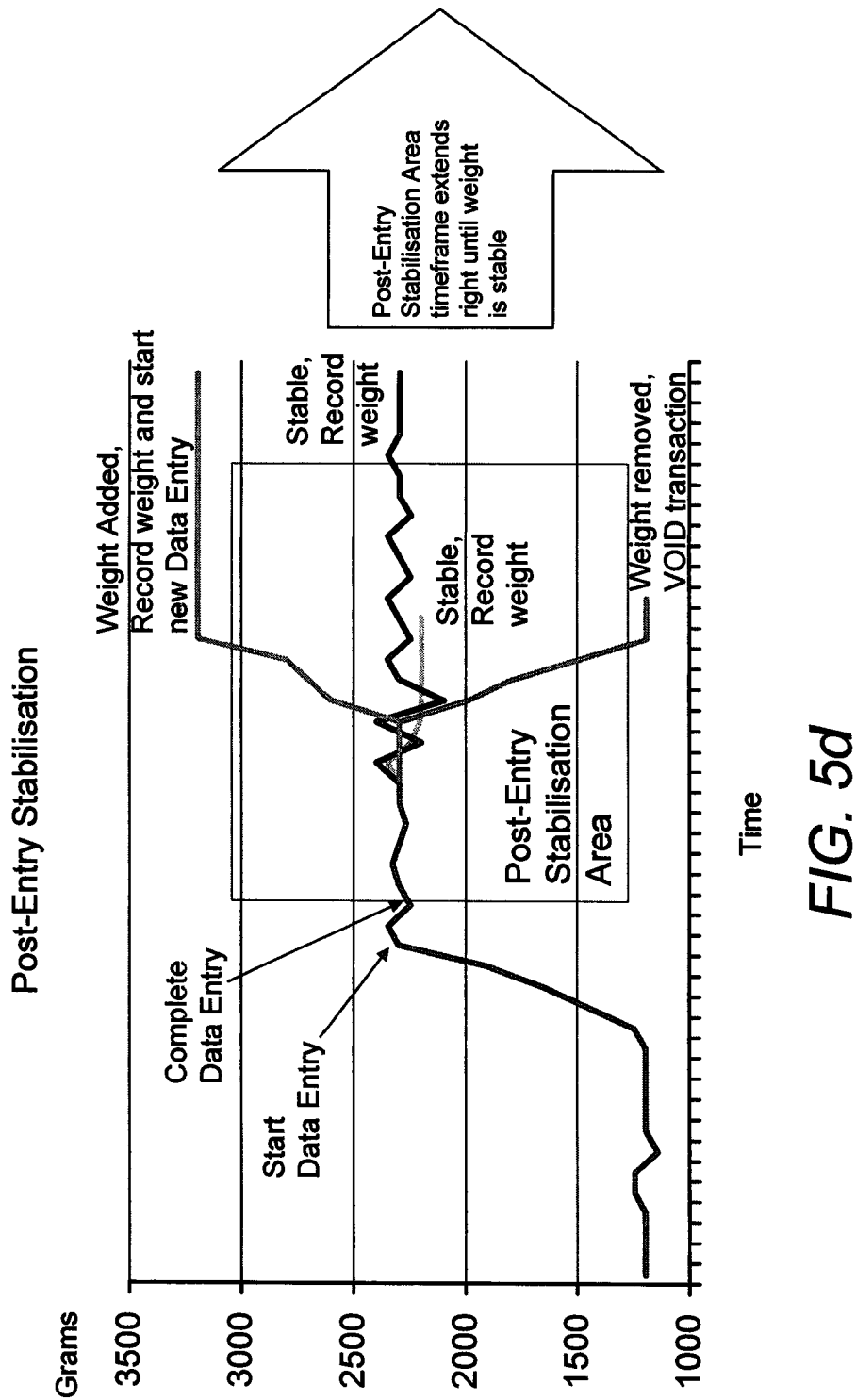

One very common case (Drop Zone 1) is depicted in more detail in FIG. 5d.

Often when a weight is disposed of, the user will lean against the bin, or rest the food container onto the bin during data-entry. The recorded weight at the completion of the data entry period becomes artificially inflated. The system 300 caters for this issue by analyzing the movement of the weight in the "post-entry stabilisation area". Only once the user has left (which could be confirmed by a camera at the system 300 or inferred via a defined time period [e.g. 8 seconds after a transaction is logged]) and the weight has stabilized and is equal to or below the weight at termination of capture (either terminated by user confirmation, or by timeout) is the transaction recorded. If the weight goes above this area, the transaction weight is recorded at the current weight and a new transaction is initiated. If the weight goes below this area the transaction is flagged as potentially void for later analysis.

Two algorithms are applied to the weight data stream to clean irrelevant and spurious transactions. This is necessary because human classification of data events is not 100% reliable. People may get interrupted or distracted before they complete categorisation of a transaction. Post processing on collected data allows two types of uncategorised transactions to be corrected: bin changes and deviations. Both of these are performed at the cloud system 340.

Bin Changes

The algorithm to detect uncategorised bin changes implements simple pattern recognition. An exemplary description of the algorithm follows:

For each weighing station
Find all uncategorised weight Changes which
a) are more than 3 Kgs
b) have occurred more than 30 minutes after previous binChange and
c) are close to the total weight on the scale (i.e. more than (totalGrossWeight—0.5 Kgs))
d) have had no categorised transactions since the last scale "tare"
and re-categorise them as binChanges.

Deviation Cleanup

The purpose of deviation cleanup logic is to intercept inconsistencies in the weight stream and smooth them out. For example, the bin might be removed from the scale, have additional waste put into it and then put back on the scale. In this case an unexplained gap in the weight stream would occur.

An exemplary description of a deviation cleanup algorithm follows:

In a time series of weight change transactions, for each transaction, let:

Deviation=average change in totalGrossWeight between prior and next transaction.
Gap=difference between prior and next transaction.
Now to clean up deviations:

```
For each Weighing Terminal
    Look at the transactions immediately before and
    after each uncategorised transaction
        If ( Deviation > 200g and
        Gap < abs(deviation/5) and
        There are no binchanges in the surrounding 3
        transactions, in either direction (prior or
        next).
        ) then
            • Modify the weight change of the
              transaction to equal the difference
              between the previous and next
              Transactions.
            • Modify the total gross weight of the
              transaction to equal that of the next
              transaction.
            • Ignore the next transaction by
              setting its weight to zero.
        end if;
```

Thus spurious, uncategorised transactions are smoothed to deliver a consistent, continuous time series of weight changes.

Use of Face Recognition to Improve Engagement/Compliance/Reporting in a Kitchen

Food waste tracking in its current form requires some staff involvement, which consists primarily of data-entry tasks. One of the biggest challenges of tracking waste accurately over long periods of time, is keeping the staff engaged in the process. Face recognition, and the ability to identify the user(s) present during each transaction, and at other various times of day, may unlock a variety of features that can improve the experience and staff compliance.

Identification of Users

The first step to create a more engaging relationship between the system 300 and users, requires identifying them by name. Since the system 300 is always on in an area often visited by staff (the bin), there are plenty of occasions to solicit users to enter their name.

EXAMPLES

Hey, I don't think we've met. What's your name? [e.g. 72 hours from install date]
Hey, you must be new here what's your name? [e.g. new face 2 and weeks after install]
Hey, I've seen you 20 times and I still don't know your name!
Hey we've known each other for 3 weeks and I still don't know your name!

Seamless User Onboarding

One of the reasons for reduction in compliance is employee churn. New employees that are not properly trained may be unsure of how to use the system 300, or be unaware of its benefits to the company and the environment. Face recognition may allow the system 300 to immediately recognize a new employee, and present an onboarding tutorial with no assistance from other staff.

EXAMPLES

Hi Ramiro . . . . Looks like this is your first time giving me food. Do you want to watch a quick video tutorial of how I work?

Positive Feedback/Gamification

The primary reason for low compliance is the tedious nature of waste categorisation. To combat this issue, the system 300 may utilise ideas from the field of enterprise gamification. All the tasks performed are recorded on a user-basis, and played back to give users an overview of how much they've helped the environment, how well they are doing compared to their peers, and how far they are from reaching certain milestones

EXAMPLES

Thank you Ramiro. You just threw away $4.40 worth of Salmon.
Wow, Jimmy, you've categorized 100% of the food you've given me. I'm sending a message to Ramiro right now!
Hey Jimmy, you've categorized more food than anyone else here. Have a look at this chart below.

Feedback may also be provided to users to accommodate accountability, personalisation & reporting, and problem detection as outlined below:

Accountability

EXAMPLES

Hey Jimmy, only 50% of the food today was categorized . . . . This makes me sad :( Personalisation & Reporting

EXAMPLES

Hey Jimmy, you've just taken first place in our ranking table! What song do you want me to play?
Hey Ramiro, the kitchen has thrown away 3× as much food today, compared to last week. Have a look at the chart below . . . .

Problem Detection

>Hey Jimmy. I noticed no one has categorized any of the food thrown away in the last 24 hours. Is anything wrong with me? If so, call +4477391 . . . .

A potential advantage of some embodiments of the present invention is that the use of a waste receptacle which receives food waste from multiple disposal events enables the collection of accurate and complete data relating to food waste in commercial environments.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A system for monitoring food waste, including:
   a weight mechanism configured for weighing a waste receptacle, wherein the waste receptacle is configured for receiving food waste from a plurality of consecutive disposal events before emptying the waste receptacle;
   a processor configured for measuring differences in weight of the waste receptacle between consecutive disposal events of the plurality of consecutive disposal events and calculating the weight for the disposal events of the plurality of consecutive disposal events based upon the measured differences; and
   a user interface configured to receive, for each of the calculated weights, at least one indication categorising the food waste in a disposal event by a user.

2. A system as claimed in claim 1, further including a central server, and wherein the calculated weights and the categorisations of disposal events are transmitted to the central server.

3. A system as claimed in claim 2, wherein the central server is configured for receiving weights and categorisations of disposal events from a plurality of locations.

4. A system as claimed in claim 2, wherein the calculated weights and the categorisations of disposal events are transmitted to the central server periodically.

5. A system as claimed in claim 2, wherein the central server is configured to analyse the calculated weights and the received categorisation of disposal events to generate a report.

6. A system as claimed in claim 5, wherein the report includes suggestions for reducing waste based on the analysis.

7. A system as claimed in claim 5, wherein the report is delivered electronically to a user device.

8. A system as claimed in claim 1, wherein the weights and/or categorisations are processed to remove user error.

9. A system as claimed in claim 1, further including a central server, and wherein the weights and the categorisations of disposal events are transmitted to the central server and wherein the central server is configured to process the weights and/or the categorisations to remove user error.

10. A system as claimed in claim 8, wherein the processor is configured to process the weights and/or the categorisations to remove user error.

11. A system as claimed in claim 10, wherein the user error removal processing includes detecting erroneous weights and correcting the erroneous weights.

12. A system as claimed in claim 11, wherein erroneous weights are detected and corrected using deviations from previous and later disposal events.

13. A system as claimed in claim 11, wherein the processor detects erroneous weights for a disposal event caused by user presence by detecting a weight change and the absence of a user.

14. A system as claimed in claim 13, wherein the processor corrects erroneous weights for a disposal event caused by user presence by utilising a weight signal to calculate the weight for the disposal event once the user is absent.

15. A system as claimed in claim 8, wherein the user error removal processing includes detecting erroneous disposal events.

16. A system as claimed in claim 15, wherein pattern recognition is utilised to detect and correct erroneous disposal events.

17. A system as claimed in claim 1, wherein the user interface is configured to receive indications from a plurality of category types.

18. A system as claimed in claim 17, wherein the category types include a stage of waste occurrence, type of waste, specific waste, and/or reason for dumping out the waste.

19. A system as claimed in claim 1, wherein the user interface is further configured to prompt the user for categorisation.

20. A system as claimed in claim 19, wherein the user interface prompts the user by providing options within a multi-stage menu.

21. A system as claimed in claim 20, wherein selection of at least one of the options by the user triggers display of further options, such that several indications in different category types are received from the user to categorise the food waste.

22. A system as claimed in claim 20, wherein selection of at least one of the options automatically categorises the food waste into a plurality of category types without further indications.

23. A system as claimed in claim 20, further including a central server, and wherein the weights and the categorisations of disposal events are transmitted to the central server and wherein the multi-stage menu is updated periodically from the central server.

24. A system as claimed in claim 1, further including a stability controller configured to receive weight signals from the weight mechanism, detecting weight changes at the weight mechanism and controlling transmission of weight signals to the processor based upon the stability of the weight signal.

25. A system as claimed in claim 24, wherein the stability controller is configured to determine when the weight signal is stable based on a period of time of stability where the period of time is generated based on the magnitude of change in the weight signal.

26. A system as claimed in claim 25, wherein the period of time is increased when the magnitude of change is less than a first threshold.

27. A system as claimed in claim 25, wherein the weight signal is updated and retransmitted to the processor after expiration of a period of time when the magnitude of change is greater than a second threshold.

28. A system as claimed in claim 26, wherein the first and/or second thresholds are defined periodically.

29. A system as claimed in claim 28, wherein the first and/or second thresholds are defined based upon historical data for the weight mechanism.

30. A system as claimed in claim 1, further including a user identity system.

31. A system as claimed in claim 30, wherein the user identity system is automatic.

32. A system as claimed in claim 31, wherein the user identity system includes a camera, and is configured to perform facial recognition to identify users.

33. A system as claimed in claim 30, wherein the user identity system is configured to regularly prompt initially unidentifiable users via the user interface to obtain identity information.

34. A system as claimed in claim 30, wherein the user identity system is configured to present a tutorial to newly identified users.

35. A system as claimed in claim 34, wherein the user identity system includes a camera, and is configured to perform facial recognition to identify users and wherein newly identified users are identified via facial recognition.

36. A system as claimed in claim 30, wherein at least some of the weights and/or the categorisations of disposal events are assigned to a user identity.

37. A system as claimed in claim 36, wherein the system is further configured to analyse the weights and/or the categorisations of disposal events for a user and to display results of the analysis to the user.

38. A method for monitoring disposal of food waste into a waste receptacle configured to receive food waste from a plurality of consecutive disposal events before emptying the waste receptacle, including:
a processor receiving a first weight from a weight mechanism, configured for weighing the waste receptacle, after a first disposal event of the plurality of consecutive disposal events;
the processor receiving a second weight from the weight mechanism of the waste receptacle after a second disposal event consecutive to the first disposal event;
the processor determining the weight for the second disposal event based on the difference between the first and second weights; and
a user interface receiving an input from a user to categorise the food waste for the second disposal event.

39. A system for monitoring food waste, including:
a weight mechanism configured to weigh a waste receptacle configured to receive food waste from a plurality of consecutive disposal events before emptying the waste receptacle;
one or more processors coupled to the weight mechanism and configured to at least:
receive a first weight from the weight mechanism after a first disposal event of the plurality of consecutive disposal events;
receive a second weight from the weight mechanism of the waste receptacle after a second disposal event consecutive to the first disposal event;
determine the weight for the second disposal event based on the difference between the first and second weights;
after receiving the second weight from the weight mechanism, display, on a display, options for categorising the food waste for the second disposal event;
based on the displayed options, receive one or more user inputs categorising the food waste for the second disposal event; and
generate a food waste report for the plurality of consecutive disposal events based on the weight for the second disposal event and the received one or more user inputs categorising the food waste for the second disposal event.

* * * * *